US009918128B2

United States Patent
Courouge et al.

(10) Patent No.: US 9,918,128 B2
(45) Date of Patent: Mar. 13, 2018

(54) CONTENT CATEGORIZATION USING FACIAL EXPRESSION RECOGNITION, WITH IMPROVED DETECTION OF MOMENTS OF INTEREST

(71) Applicant: ORANGE, Paris (FR)

(72) Inventors: M. Guillaume Courouge, San Francisco, CA (US); M. Antonin Lapiche, Redwood City, CA (US)

(73) Assignee: Orange, Paris (FR)

( * ) Notice: Subject to any disclaimer, the term of this patent is extended or adjusted under 35 U.S.C. 154(b) by 0 days.

(21) Appl. No.: 15/479,542

(22) Filed: Apr. 5, 2017

(65) Prior Publication Data

US 2017/0295402 A1    Oct. 12, 2017

Related U.S. Application Data

(60) Provisional application No. 62/320,344, filed on Apr. 8, 2016.

(51) Int. Cl.
*H04H 60/56* (2008.01)
*H04N 21/442* (2011.01)
(Continued)

(52) U.S. Cl.
CPC ... *H04N 21/44218* (2013.01); *G06K 9/00302* (2013.01); *H04N 21/44204* (2013.01);
(Continued)

(58) Field of Classification Search
CPC .......... H04N 21/44218; H04N 21/854; H04N 21/44204; H04N 21/4668; H04N 21/44222
(Continued)

(56) References Cited

U.S. PATENT DOCUMENTS 5,434,678 A * 7/1995 Abecassis ............... A63F 13/10
                                                          348/E5.102
6,112,186 A * 8/2000 Bergh ............... G06F 17/30699
                                                          705/14.37

(Continued)

*Primary Examiner* — Michael B Pierorazio
(74) *Attorney, Agent, or Firm* — Haverstock & Owens LLP

(57) ABSTRACT

The invention relates to content categorization and a method to that end comprises acts of:
  rendering content within graphical user interfaces to a plurality of viewers;
  receiving multiple signals related to feedbacks from the plurality of viewers relatively to the rendered content; and
  tallying the multiple received signals from the plurality of viewers to categorize the content.
More particularly:
  the content is fragmented into a plurality of fragments having a predetermined duration,
  each signal comprises data of a facial expression recognition of each viewer, to sense a mood expression of the viewer during the content rendering,
  a memory is provided for storing at least timestamps associated to fragments for which an intensity of the sensed mood expression of a viewer is above a first threshold, and
  a processing circuit is further provided for implementing tallying acts of:
    For all the viewers and for each given timestamp, using the memory for counting a first number of viewers for which the intensity is above the first threshold during the fragment corresponding to the given timestamp, and
    When the first number is above a second threshold, labelling the fragment corresponding to the given timestamp as a moment of interest of the content.

13 Claims, 5 Drawing Sheets

Figure 1D:
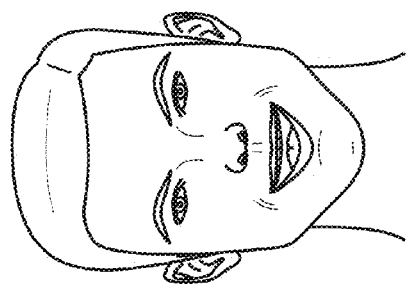
Figure 1C:
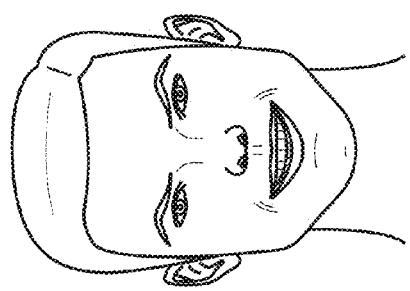
Figure 1B:
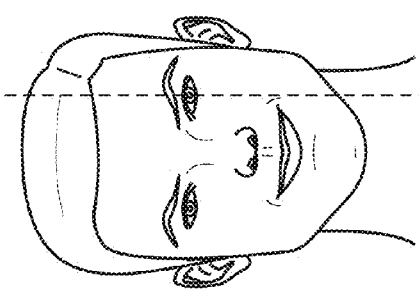
Figure 1A:
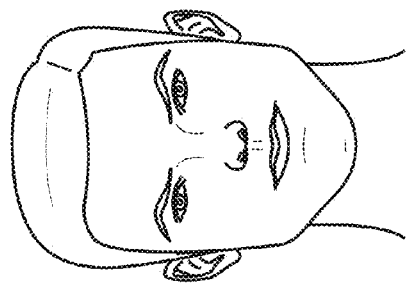

(51) Int. Cl.
  *H04N 21/466* (2011.01)
  *H04N 21/854* (2011.01)
  *G06K 9/00* (2006.01)

(52) U.S. Cl.
  CPC ... *H04N 21/44222* (2013.01); *H04N 21/4668* (2013.01); *H04N 21/854* (2013.01)

(58) Field of Classification Search
  USPC .......................................................... 725/12
  See application file for complete search history.

(56) References Cited

U.S. PATENT DOCUMENTS

| | | | | |
|---|---|---|---|---|
| 6,259,486 | B1* | 7/2001 | Mahvi | H04N 5/44 348/553 |
| 6,287,199 | B1* | 9/2001 | McKeown | A63F 13/12 348/E7.071 |
| 6,341,504 | B1* | 1/2002 | Istook | A61B 5/0002 2/69 |
| 6,413,225 | B1* | 7/2002 | Sackner | A61B 5/0803 600/529 |
| 6,551,252 | B2* | 4/2003 | Sackner | A61B 5/0205 600/301 |
| 6,783,498 | B2* | 8/2004 | Sackner | A61B 5/0205 600/481 |
| 6,840,907 | B1* | 1/2005 | Brydon | A61B 5/113 600/534 |
| 7,117,518 | B1* | 10/2006 | Takahashi | G06F 17/30867 725/86 |
| 7,120,880 | B1* | 10/2006 | Dryer | G06Q 30/02 715/863 |
| 7,207,948 | B2* | 4/2007 | Coyle | A61B 5/0476 600/529 |
| 7,246,081 | B2* | 7/2007 | Hill | G06Q 30/02 705/7.32 |
| 7,430,360 | B2* | 9/2008 | Abecassis | G11B 19/02 348/E5.105 |
| 7,603,683 | B2* | 10/2009 | Reto | H04L 29/06027 709/204 |
| 7,727,161 | B2* | 6/2010 | Coyle | A61B 5/0476 600/529 |
| 7,730,507 | B2* | 6/2010 | Sakai | H04N 5/4401 348/730 |
| 8,190,907 | B2* | 5/2012 | Tu | A63F 13/12 713/186 |
| 8,712,110 | B2* | 4/2014 | Eckhoff | G06Q 30/02 345/1.3 |
| 8,924,993 | B1* | 12/2014 | Niebles Duque | H04L 29/06462 725/9 |
| 2003/0045806 | A1* | 3/2003 | Brydon | A61B 5/0816 600/534 |
| 2003/0063222 | A1* | 4/2003 | Creed | H04N 7/163 348/687 |
| 2005/0086069 | A1* | 4/2005 | Watson | H04N 21/4508 726/3 |
| 2005/0091680 | A1* | 4/2005 | Kondo | H04N 7/163 725/12 |
| 2005/0119540 | A1* | 6/2005 | Potts | A61B 5/14532 600/315 |
| 2005/0119586 | A1* | 6/2005 | Coyle | A61B 5/0806 600/538 |
| 2005/0240087 | A1* | 10/2005 | Keenan | A61B 5/0205 600/301 |
| 2005/0262542 | A1* | 11/2005 | DeWeese | H04L 12/1818 725/106 |
| 2006/0110136 | A1* | 5/2006 | Abecassis | G11B 7/14 386/261 |
| 2006/0143647 | A1* | 6/2006 | Bill | G06F 17/30743 725/10 |
| 2006/0177109 | A1* | 8/2006 | Storch | A63F 1/00 382/118 |
| 2006/0256133 | A1* | 11/2006 | Rosenberg | G06F 3/013 345/619 |
| 2007/0050715 | A1* | 3/2007 | Behar | A61B 5/0002 715/706 |
| 2007/0110298 | A1* | 5/2007 | Graepel | G06K 9/00355 382/154 |
| 2007/0124756 | A1* | 5/2007 | Covell | G06F 17/30743 725/18 |
| 2007/0150916 | A1* | 6/2007 | Begole | H04H 60/31 725/10 |
| 2007/0152994 | A1* | 7/2007 | Koh | H04N 5/63 345/211 |
| 2007/0203911 | A1* | 8/2007 | Chiu | G06F 17/30017 |
| 2007/0270671 | A1* | 11/2007 | Gal | A61B 5/0002 600/301 |
| 2007/0271580 | A1* | 11/2007 | Tischer | H04H 60/07 725/35 |
| 2008/0155614 | A1* | 6/2008 | Cooper | G06F 21/10 725/91 |
| 2008/0169930 | A1* | 7/2008 | Mallinson | G06Q 30/02 340/573.1 |
| 2008/0221401 | A1* | 9/2008 | Derchak | A61B 5/16 600/301 |
| 2009/0034426 | A1* | 2/2009 | Luft | H04L 41/5009 370/252 |
| 2009/0133051 | A1* | 5/2009 | Hildreth | H04N 5/4403 725/28 |
| 2009/0138805 | A1* | 5/2009 | Hildreth | G06K 9/00335 715/745 |
| 2009/0157482 | A1* | 6/2009 | Jung | A61B 5/04842 705/7.33 |
| 2009/0158309 | A1* | 6/2009 | Moon | G06K 9/00778 725/12 |
| 2009/0158374 | A1* | 6/2009 | Malaure | A63F 13/12 725/114 |
| 2009/0164655 | A1* | 6/2009 | Pettersson | H04L 65/4015 709/231 |
| 2009/0164917 | A1* | 6/2009 | Kelly | G06F 3/011 715/757 |
| 2009/0172757 | A1* | 7/2009 | Aldrey | H04N 7/165 725/110 |
| 2009/0195392 | A1* | 8/2009 | Zalewski | G06F 3/012 340/573.1 |
| 2009/0228397 | A1* | 9/2009 | Tawakol | G06Q 30/0601 705/80 |
| 2009/0248975 | A1* | 10/2009 | Daud | G06F 11/0709 711/112 |
| 2010/0008547 | A1* | 1/2010 | Yagnik | G06F 17/30781 382/118 |
| 2010/0070700 | A1* | 3/2010 | Borst | G06F 17/3048 711/113 |
| 2010/0075749 | A1* | 3/2010 | Seshadri | A63F 13/10 463/29 |
| 2010/0122293 | A1* | 5/2010 | Craner | H04N 5/44582 725/40 |
| 2010/0131385 | A1* | 5/2010 | Harrang | G06Q 30/00 705/26.1 |
| 2010/0250672 | A1* | 9/2010 | Vance | G06Q 10/109 709/204 |
| 2010/0299210 | A1* | 11/2010 | Giraud | G06Q 30/02 705/14.66 |
| 2010/0304853 | A1* | 12/2010 | Kukita | G07F 17/3206 463/30 |
| 2011/0018875 | A1* | 1/2011 | Arahari | G06T 15/04 345/420 |
| 2011/0065490 | A1* | 3/2011 | Lutnick | G07F 17/32 463/16 |
| 2011/0072448 | A1* | 3/2011 | Stiers | H04N 7/17318 725/10 |
| 2011/0099572 | A1* | 4/2011 | Craner | H04N 7/163 725/25 |
| 2011/0154385 | A1* | 6/2011 | Price | H04H 60/45 725/12 |
| 2011/0193971 | A1* | 8/2011 | Lin | H04N 7/18 348/207.1 |

(56) References Cited

U.S. PATENT DOCUMENTS

| | | | |
|---|---|---|---|
| 2011/0275432 A1* | 11/2011 | Lutnick | G07F 17/3232 463/25 |
| 2011/0283189 A1* | 11/2011 | McCarty | H04N 5/44543 715/707 |
| 2012/0135799 A1* | 5/2012 | Okada | G07F 17/32 463/25 |
| 2012/0218266 A1* | 8/2012 | Maeta | H04N 13/0011 345/422 |
| 2012/0222057 A1* | 8/2012 | Sadowsky | H04N 21/251 725/10 |
| 2012/0244939 A1* | 9/2012 | Braun | G06K 9/228 463/31 |
| 2012/0262574 A1* | 10/2012 | Park | G06F 3/017 348/143 |
| 2012/0324493 A1* | 12/2012 | Holmdahl | H04H 60/33 725/12 |
| 2013/0018719 A1* | 1/2013 | Abraham | G06Q 30/0242 705/14.41 |
| 2013/0111509 A1* | 5/2013 | Guo | G06K 9/00677 725/12 |
| 2013/0246323 A1* | 9/2013 | Athas | G06N 5/02 706/46 |
| 2013/0254795 A1* | 9/2013 | Botta | H04N 21/4751 725/28 |
| 2013/0312041 A1* | 11/2013 | Gresta | H04N 21/2365 725/61 |
| 2014/0007150 A1* | 1/2014 | Bhide | H04N 21/454 725/14 |
| 2014/0309511 A1* | 10/2014 | Stal | A61B 5/14532 600/365 |
| 2015/0070516 A1* | 3/2015 | Shoemake | H04N 21/42203 348/207.11 |
| 2016/0089041 A1* | 3/2016 | Keat | A61B 5/72 600/479 |

* cited by examiner

CONTENT CATEGORIZATION USING FACIAL EXPRESSION RECOGNITION, WITH IMPROVED DETECTION OF MOMENTS OF INTEREST

The present invention relates to content categorization.

The content can be a multimedia content such as a movie, or a radio show, etc.

The content can be deemed to belong to a particular category of content. For example, in a case where the content is a movie, it can belong to the category of comedies, or to the category of horror movies, or thrillers, etc.

However, it can be more appropriate in some cases to give a quantitative score to a content (a movie in the examples given hereafter), such as a score of intensity of the emotion (laugh, fear, astonishment) felt by viewers when watching the movie. Therefore, testers can watch a movie and a score is given to the movie then.

It has been found that an efficient way to get objective feedbacks from the viewers, was to sense directly the mood expressions of the viewers by filming their faces and analyzing particular features of their faces for characterizing quantitatively their emotion.

In the example of FIGS. 1A to 1D, an emotion of a viewer of a comedy can be quantified by a degree of smile measured on his mouth, the opening of his eyes, etc. The quantification of his emotion can be therefore objective thanks to such measurements. A score can therefore be given to an emotion sensed on a viewer (for example between 1 to 4 in the examples of FIGS. 1A to 1D, or more accurately between 1 and 10 as for another example).

An average of the sensed emotions over a plurality of viewers and all over the movie duration can be then given. It can correspond thus to an objective score which can be given to the content.

However, this method may not be accurate enough for detecting specific moments of the content where the sensed emotion was at a maximum. In fact, some viewers can react later than other viewers or some viewers can react and have an emotion at a moment of the content when the majority of the other viewers do not really react. Detection of true emotional moments in the content can then be altered owing to noise due to wrong interpretations of some viewers' reactions.

The present method and system aim to improve the situation.

To that end, the present system relates to a method of content categorization comprising acts of:
rendering content within graphical user interfaces to a plurality of viewers;
receiving multiple signals related to feedbacks from the plurality of viewers relatively to the rendered content; and
tallying the multiple received signals from the plurality of viewers to categorize the content.

More particularly,
the content is fragmented into a plurality of fragments having a predetermined duration,
each signal comprises data of a facial expression recognition of each viewer, to sense a mood expression of the viewer during the content rendering,
a memory is provided for storing at least timestamps associated to fragments for which an intensity of the sensed mood expression of a viewer is above a first threshold, and a processing circuit is further provided for implementing tallying acts of:

For all the viewers and for each given timestamp, using the memory for counting a first number of viewers for which the intensity is above the first threshold during the fragment corresponding to the given timestamp, and When the first number is above a second threshold, labelling the fragment corresponding to the given timestamp as a moment of interest of the content.

The sensing of mood expressions of the viewers during the content rendering can simply help to identify the mood of a user ("neutral" or "smiling-laughing"). In examples of embodiment given below, it can quantify more precisely such emotions (neutral or smiling or laughing).

The method of the present system can then be applied for preselecting moments of the content which can correspond in fact to true emotional moments. Further tests can be carried out then for determining whether a moment of interest of the content is indeed a true emotional moment or not.

As for an example of embodiment, the aforesaid memory can be further arranged for storing timestamps along with corresponding intensities for each viewer, and the method can further comprise tallying acts of:
for each moment labelled as a moment of interest of the content, calculating an average of the corresponding stored intensities,
when said average is above a third threshold, the moment of interest is further labelled as an emotional moment.

Such collected emotional moments can therefore correspond typically to "true" emotional moments as explained above.

Moreover, in a particular embodiment:
if at least a first emotional moment and a second emotional moment are separated by less than a predetermined number of fragments, then a whole part of the content extending from the first emotional moment to the second emotional moment, is labeled as one emotional moment.

Therefore, moments of true emotion can be aggregated as one and a single emotional moment. Such moments can form extracts which can be, for example, recommended to users of contents.

In an embodiment, a number of moments of interest can be counted over the content fragments and data for these moments of interest are included in a data set of recommendation of the content.

In fact, the simple moments of interest can be a first indication of the quality of the content (many funny moments of a comedy, for example).

In a complementary or alternative embodiment, a cumulated duration of moments of interest can be counted over the whole content duration and data pertaining to that cumulated duration are included in a data set of recommendation of the content.

In a further complementary or alternative embodiment, a number of emotional moments can be counted over the content fragments and data for these emotional moments are included in a data set of recommendation of the content.

The amount of true emotional moments can then be a score given to the content.

In a further complementary or alternative embodiment, at least a cumulated duration of emotional moments is counted over the whole content duration and data pertaining to that cumulated duration are included in a data set of recommendation of the content.

Advantageously, that embodiment can give further, for example, an objective score having the value of a ratio between the cumulated duration of pure emotional moments (true funny moments for example in a comedy), compared to the whole duration of the movie.

More generally, in a possible embodiment, the method can further comprise a step of calculating a content recommendation for a user according to a profile of the user, and that content recommendation can be calculated on a basis of a weighted average, weights of the average depending on the user profile and being assigned to data of a data set of recommendation of the content, said data set comprising at least data of:
- number of moments of interest counted over the content fragments,
- cumulated duration of moments of interest counted over the whole content duration,
- number of emotional moments counted over the content fragments, and
- cumulated duration of emotional moments counted over the whole content duration.

For example, a user may prefer a content having few moments of true emotion rather than a long duration of moments of interest (or the opposite, for instance). Therefore, that embodiment makes it possible to give appropriate recommendations which fit the usual preferences of each user.

In a particular embodiment, the first threshold is estimated on the basis of metadata related to the content.

In an application where different emotions can be sensed (fear, laugh, etc.), that embodiment makes it possible to raise thresholds related to non-relevant emotions (for example fear for a comedy). Of course, if several emotions are sensed, a full report on the content indicating all kinds of sensed emotions (laughs, tears, etc.) can advantageously be provided. However, if the content is deemed to be a comedy (that information being given by usual metadata associated to the content), fun or laughs can be sensed precisely with a low first threshold.

Therefore, in an embodiment, a plurality of types of facial expressions can be sensed and respective first thresholds are associated to each type of facial expression.

The present systems also teaches a content categorization system for implementing the method above, and comprising to that end:
- a processing circuit,
- an input interface connected to the processing circuit so as to receive signals related to feedbacks from a plurality of viewers relatively to a rendered content, each signal comprising data of a facial expression recognition of each viewer, each signal resulting from sensing a mood expression of the viewer during the content rendering,
- a clock connected to the processing circuit for associating a timestamp to a fragment of the content for which an intensity of the sensed mood expression of a viewer is above a first threshold, and a memory connected to the processing circuit for storing at least the timestamp,
- an output interface for delivering content recommendation data, and wherein the processing circuit is arranged for performing, in cooperation with the input interface, the clock and the memory, tallying acts of:
  For all the viewers and for each given timestamp, using the memory for counting a first number of viewers for which the intensity is above the first threshold during the fragment corresponding to the given timestamp, and
  When the first number is above a second threshold, labelling the fragment corresponding to the given timestamp as a moment of interest of the content,
so as to feed the output interface with content recommendation data derived at least from moments of interest of the content.

Figure 2:
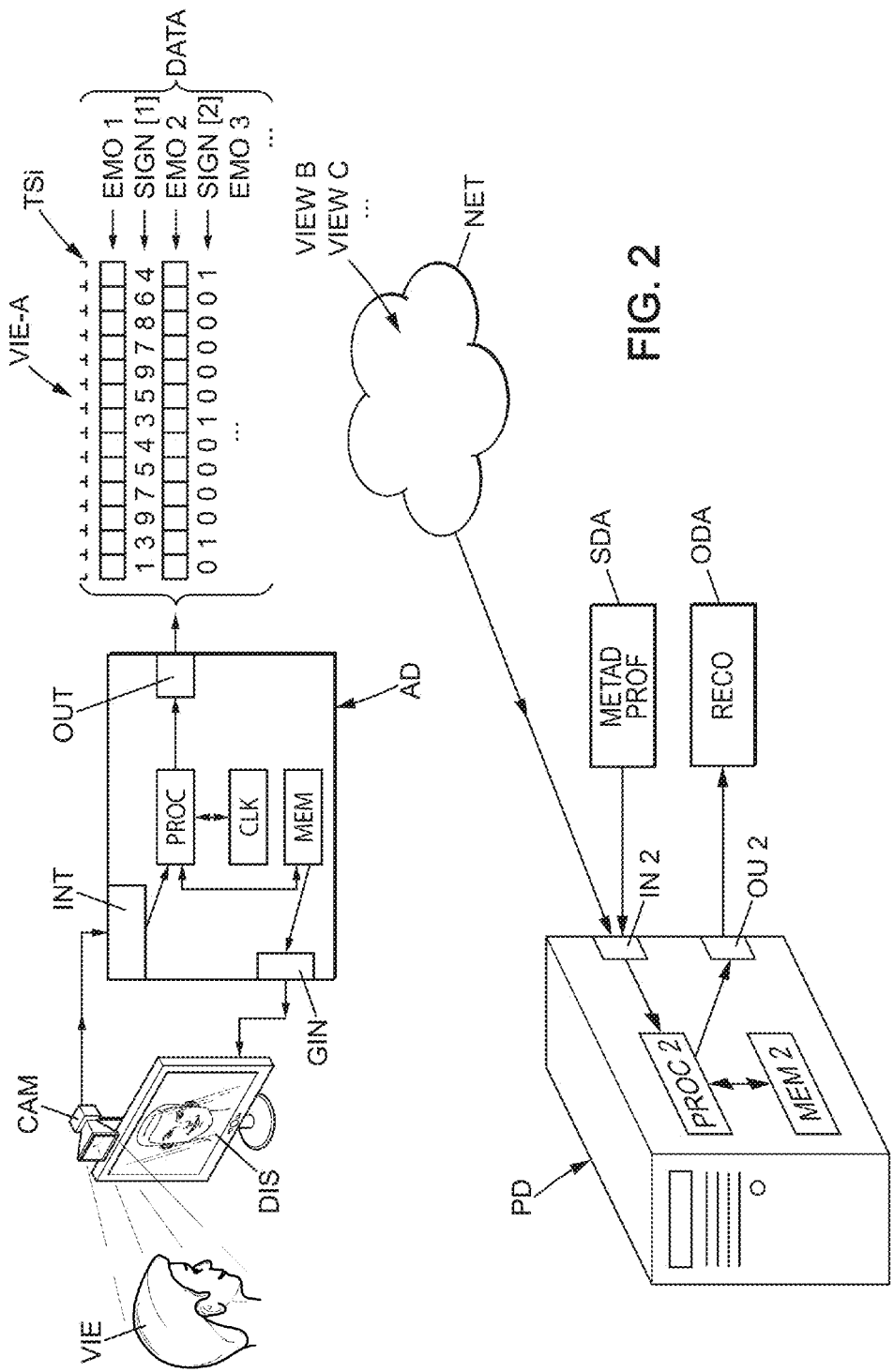

An example of the present system is shown in FIG. 2 that is commented in details below. It is to be noticed that that processing circuit can comprise one single processor or several processors (PROC, PROC2) connected to each other through a telecommunication network (NET).

The present system further teaches a content categorization device, comprising:
- an input interface for receiving timestamps associated to fragments of the content for which an intensity of a sensed mood expression of one or several viewers during a rendering said fragments is above a first threshold,
- a memory for storing at least the received timestamps,
- an output interface for delivering content recommendation data,
- and a processing circuit arranged for performing, in cooperation with the input interface and the memory, tallying acts of:
  For all the viewers and for each given timestamp, using the memory for counting a first number of viewers for which the intensity is above the first threshold during the fragment corresponding to the given timestamp, and
  When the first number is above a second threshold, labelling the fragment corresponding to the given timestamp as a moment of interest of the content,
so as to feed the output interface with content recommendation data derived at least from moments of interest of the content.

Such a content categorization device can be the processing device PD in the example of FIG. 2.

The present system is also related to a non-transitory computer-readable storage medium with an executable program stored thereon, wherein the program instructs a processor to perform the method of the invention.

That processor can be the processor PROC2 of the processing device in the example of FIG. 2.

Figure 3:
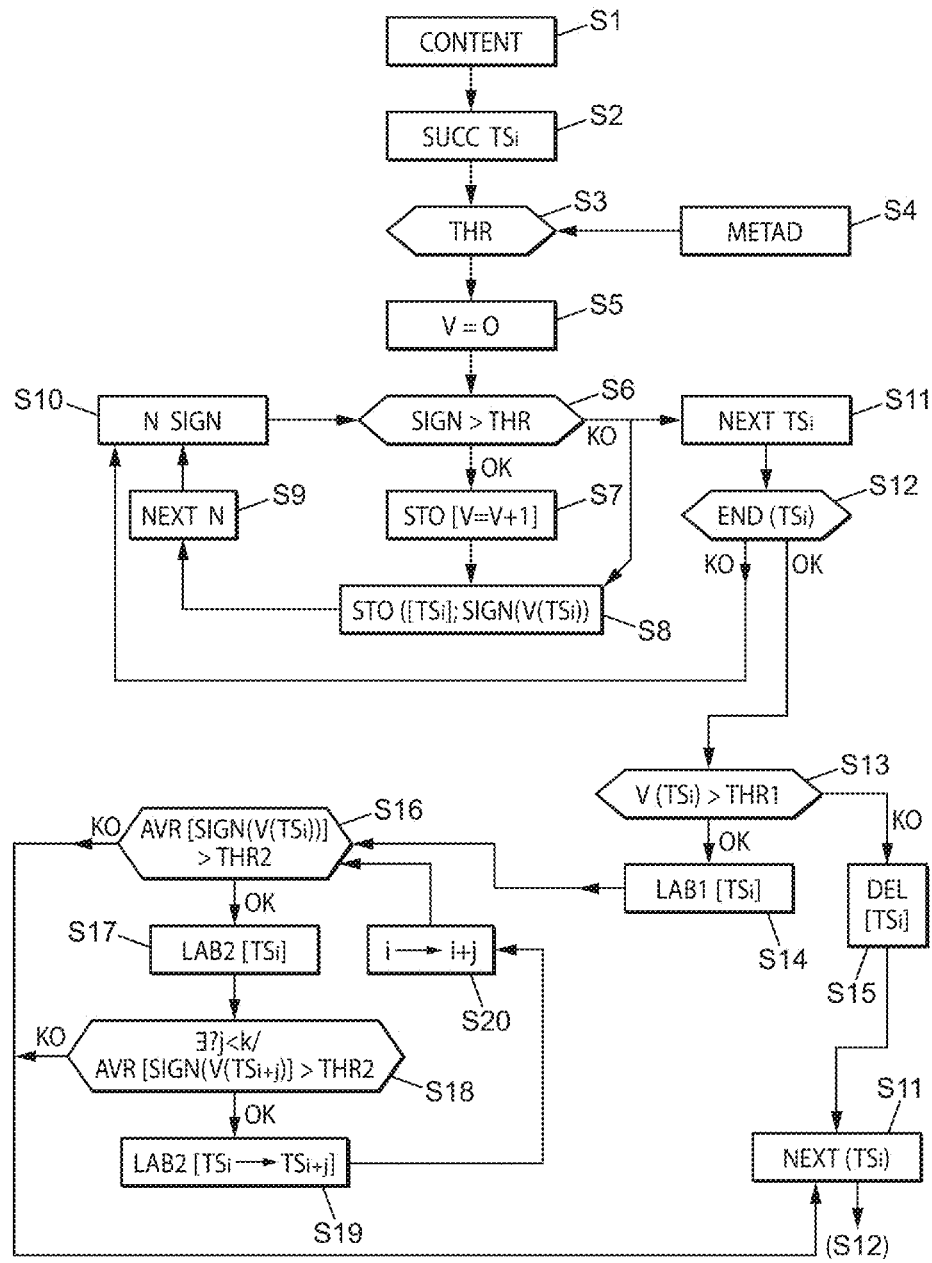
Figure 5:
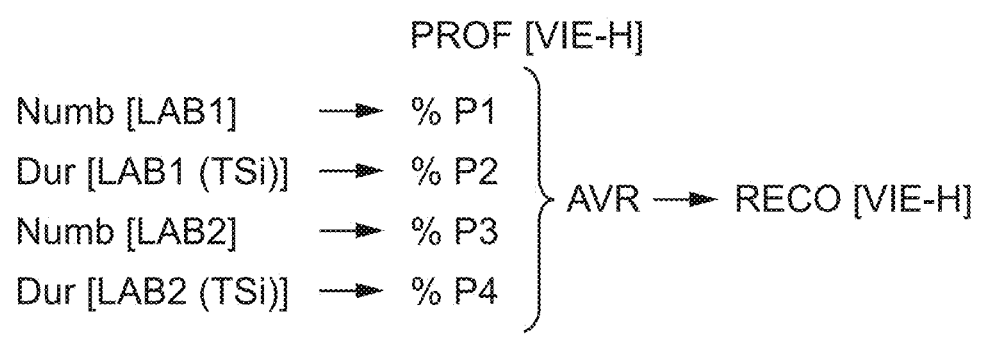

FIGS. 3 and 5 show flow charts which can correspond to an example of a main algorithm of the aforesaid executable program.

Figure 4A:
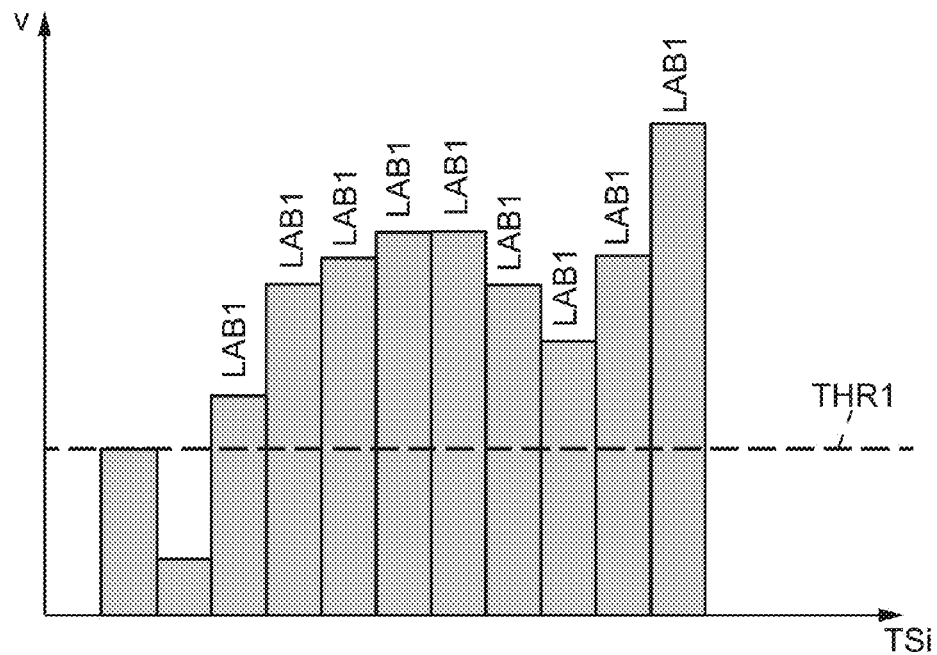
Figure 4B:
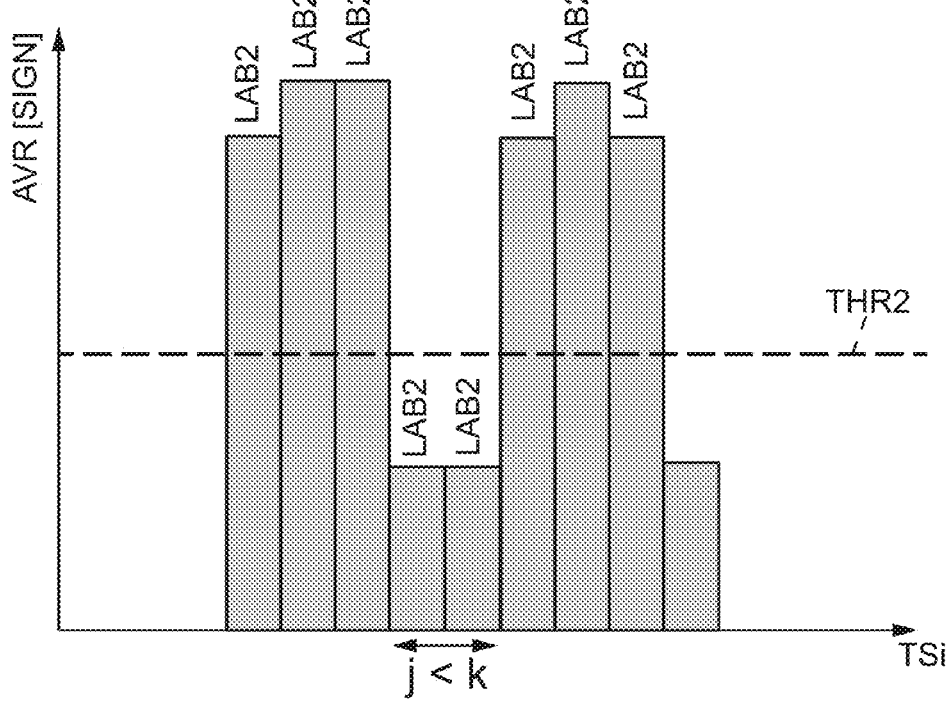

More particularly, the present system is illustrated by way of example, and not by way of limitation, in the figures of the accompanying drawings, in which like reference numerals refer to similar elements and in which:

FIGS. 1A to 1D show several degrees of a same emotion sensed on a viewer and, hence, an emotion (laugh in the shown example) that can be quantified and compared to a threshold THR, FIG. 2 shows an example of system for implementing the method of the present system, FIG. 3 shows main steps of a method according to an example of embodiment of the present system, FIG. 4A shows an example for selecting timestamps as moments of interest of the content, during which a number of viewers, above a first threshold THR1, has been sensed as having a same emotion, above the threshold THR (shown on FIG. 1B), FIG. 4B shows an example for labelling timestamps as related to moments of true emotion of the content, during which the average intensity of emotion sensed over the number of viewers selected as shown in FIG. 4A (above the first threshold THR1) is higher than a second threshold THR2, FIG. 5 shows other steps of the method for calculating recommendation data based on a predetermined profile of a user.

Referring to FIG. 2, at a venue, a viewer VIE (such as a tester) is watching a multimedia content CONT through a human/machine interface. In the shown example, the viewer VIE is watching the content (for example a movie) displayed on a screen DIS. The face (or the body) for example of the viewer is filmed with a camera CAM during the rendering of the content on the screen DIS.

The acquired images data are provided through an input interface INT of a first computer unit which is, in the example shown on FIG. 2, an acquiring device AD. Successive images of the filmed viewer VIE are processed so as to recognize facial expressions of the viewer during the content rendering. Body motions may also be acquired. More particularly, in the example of FIGS. 1A to 1D, a particular emotion (fun, in the presented example) can be sensed by measuring:

width of the viewer's mouth for detecting a smile (FIG. 1B),
opening of the mouth for detecting laugh (FIG. 1C),
opening of the eyes for detecting a big laugh (FIG. 1D), etc.

Of course, several facial expressions can be sensed (fear, fun, astonishment, etc.).

More particularly, the whole content's duration is cut into a plurality of time intervals, each time interval being designated by a timestamp TSi. The durations of the time intervals can be equal (for example every minute or two minutes of the content), or can be related to durations of scenes of the content.

Then, for each viewer (VIE-A, then VIE-B, VIE-C, and so on), a corresponding acquiring device AD at each respective venue can output successive scores assigned to each timestamp TSi and for each sensed emotion EMO1, EMO2, EMO3, etc. In the example shown in FIG. 2, the score of a smile (FIG. 1B) can be for example "3" in a scale between 0 and 9. The score of a laugh (FIG. 1C) can be "6", etc. A same AD may be used when different viewers from a same venue are view the content.

Therefore, score values SIGN[1], SIGN[2], etc., can be assigned to all successive timestamps TSi for each viewer and for each emotion, respectively EMO1, EMO2, etc.

To that end, the acquiring device AD generally comprises a processing unit including:

a processor PROC receiving images data through the interface INT,
a memory unit MEM storing instructions of a computer program which can be read by the processor PROC so as to run a program for recognizing facial expressions and quantifying related emotions,
a clock CLK for assigning a score of emotion SIGN to the right timestamp TSi, during the rendering of the content on the display DIS.

In order to synchronize correctly the scores and the timestamps, in an exemplary embodiment, it is preferred to command the display DIS directly through an output graphic interface GIN provided in the acquiring device AD and controlled by the processor PROC. In the example shown in FIG. 2, data of the multimedia content to display are stored in the memory unit MEM (controlled by the processor PROC).

The AD may be a mobile device, a tablet, a computer and more generally any electronic device comprising the here above elements and units.

Once data of scores corresponding to successive timestamps for each emotion and each viewer are computed (dataset referenced as "DATA" on the right part of FIG. 2) for the same content CONT, they can be outputted through an output interface OUT and, for example, sent through a network NET to a distant processing device PD which performs the acts of tallying these scores data as described below.

As a first main step that performs the processing device PD (after reception of course of data through its input interface IN2), for each timestamp TSi (and each kind of emotion), all the scores having a value greater than a threshold THR are counted over all the viewers for the content CONT. That threshold THR can be set to a score above 3 for example (as shown on FIG. 1B) if the content is a comedy and if fun is the sensed emotion (while for other emotions such as fear, the threshold can be upper, for example 7 or 8).

Therefore, the processing device PD can use informative data related to the content (such as metadata referenced "METAD" on FIG. 2, indicating that the content is a comedy for example) which are given further to the scores data "DATA", as supplementary data SDA about the content, and/or about profiles (PROF) of future users of the content as described below with reference to FIG. 5.

Once the scores above the threshold THR are counted over the whole number N of viewers for each timestamp, the graph shown on FIG. 4A can be obtained. It shows, for each timestamp TSi, the number of viewers V having an emotion greater than the threshold THR. Each viewer having a score above 3 for example (if the threshold THR is 3) at the timestamp TSi is counted, and the amount V resulting from that counting is compared to a so-called "first threshold" THR1. As for an example, that first threshold THR1 can be chosen relatively low, for example 10%. Therefore, when the number of viewers V who reacted to the content (having a score of emotion higher than THR=3 for example) at a moment TSi is above 10% (for example more than 100 people over one thousand viewers), then that moment TSi can be labelled as a moment of interest of the content (reference LAB1 of FIG. 4A).

Then, referring now to FIG. 4B, for each timestamp TSi labelled as a moment of interest LAB1, an average score over the whole number N of viewers (N=1000 for example) is computed and compared to a so-called "second threshold" THR2 (for example THR2=5). As an alternative embodiment, the average can be computed over the V viewers who reacted to the content during that timestamp TSi.

When the calculated average (referenced AVR[SIGN] on FIG. 4B) is higher than the second threshold THR2, then the corresponding timestamp TSi can be labelled as a moment of true emotion (referenced LAB2 on FIG. 4B).

As a further development, if two moments of true emotion are timely separated by less than k successive timestamps, then the whole duration between these two moments can be labelled as a moment of true emotion (as shown with the arrow "j<k" in the example of FIG. 4B where finally a duration of 8 timestamps can be labelled as a moment of true emotion).

Referring back now to FIG. 2, in order to perform such a labelling and provide hence objective recommendations, the processing device PD can comprise:

a processor PROC2 receiving successive scores data and possibly other supplementary data SDA through the input interface IN2, a memory unit MEM2 storing instructions of a computer program according to the invention so as to perform the aforesaid tallying acts when such instructions are run by the processor PROC2, and an output interface OU2 controlled by the processor PROC2 so as to deliver recommendation data ODA.

The processing device PD may receive the successive score data and other supplementary data SDA associated to an identifier for the content, when processing scores for several content in parallel. The identifier is associated to the content in a content database and known from the acquiring device so that the data collected by the acquiring device is associated to a specific content CONT.

The whole steps of the method according to an embodiment of the present system are commented hereafter with reference to FIG. 3.

In a first step S1, the same content CONT (associated to identifier CONT_ID) is being displayed to N viewers. For example the memory MEM storing the content's data, in the acquiring device AD, can be read to that end. Furthermore, the content is fragmented into several successive pieces of durations, each piece being assigned with a timestamp TSi, at step S2. More particularly, that step is carried out S2 is preferably carried out during the rendering of the content and the clock CLK of the acquiring device AD ensures the synchronization between:

the assumed timestamps during the content's rendering, and the assumed timestamps corresponding to moments when reactions of a viewer can be sensed.

It is thus possible to assign to each timestamp a level of reaction of each viewer, and more particularly to detect facial expressions corresponding to an emotion above a predetermined threshold THR in step S3. That threshold can depend on the type of emotion to detect in particular and can depend on the nature of the content (fun, for example, for a comedy). To that end, metadata related to the content can be used in step S4, so as to set a value for the threshold THR.

Step S5 is related to loop over the whole number N of viewers for a given content, and more particularly step S5 sets, for the beginning of that loop, a value of "0" to a variable V counting the number (V) of viewers who react above the threshold THR at a timestamp TSi during the content's rendering. Therefore, the test S6 is carried out for each viewer so as to detect if he or she reacts to the content CONT above the threshold THR, at a timestamp TSi. If this is the case (arrow "OK" as output from test S6), then that occurrence for that viewer is counted in a memory and a counter (of variable V for the content referred by its identifier CONT_ID) is incremented accordingly in step S7. Otherwise (arrow "KO" as output from test S6), the process of detection of emotion jumps to the next timestamp TSi in step S11 (until the end of the content in step S12). Furthermore, the score of the sensed emotions SIGN(V(TSi)) are stored for each viewer in correspondence with each timestamp TSi in step S8. In a possible alternative embodiment, the only scores to be stored are the ones related to viewers who reacted above the threshold THR (and in that case, the arrow from KO-S6 to S8 can be withdrawn). The process is performed for each viewer (step S9) and until the whole number of viewers N is reached (step S10).

Once the process is carried out for all the viewers and all the timestamps, in step S13, the number of viewers V for the content CONT who reacted at a given timestamp TSi is compared to a first threshold THR1, and if that number V is above that threshold THR1, then the moment corresponding to that given timestamp TSi is labelled as a moment of interest of the content (LAB1 is step S14). Otherwise (arrow KO from box S13), data stored relatively to that given timestamp TSi can be deleted in step S15.

Furthermore, for that given timestamp TSi, when labelled as a moment of interest LAB1, the scores average of the N viewers (or possibly over only the V viewers reacting at TSi) is compared to a second threshold THR2, in step S16 (as shown on FIG. 4B commented previously). If that average is higher than the second threshold THR2 (arrow OK as output from test S16), then the moment corresponding to the given timestamp TSi is furthermore labelled as a moment of true emotion (LAB2 in step S17) for the content CONT.

In step S18, a test can be performed so as to detect whether two timestamps TSi and TSj corresponding to two successive moments labelled as moments of true emotion LAB2 are separated by less than k timestamps (for example k=5), in order to label, in step S19, the whole passage of the content extending from timestamp TSi to timestamp TSj as a moment of true emotion LAB2.

The process is performed for each timestamp TSi (back to step S11 and until the end of the content in step S12, in the example of FIG. 3).

Therefore, in practice, each labelled timestamp TSi (or successions of less than k timestamps) can be assigned, in a memory MEM2 of the processing device PD, with a data value (for example "01" for a moment of interest LAB1, and "11" for a moment of true emotion LAB2). This makes it possible then to build extracts of the content, and/or count the number of timestamps having a particular value, or count the whole duration of those labelled moments, in order to provide recommendations.

The particular steps S13 and S14 are carried out by the processing device PD and are of particular interest to define true emotional moments. Steps S16 and S17, as well as steps S18, S19 and step S4 (for carrying out steps S3 and S6) may be seen as related to optional embodiments. All labels, timestamps, scores ... calculated by the processing device PD may be stored in a memory in an entry associated to the content identifier CONT_ID.

Then, referring now to FIG. 5, for a viewer VIE-H having usual preferences, such as for example:

enjoying comedies during which the spectator smiles during mainly the whole movie, but not appreciating that much comedies having very funny passages but only few passages of that kind (while the other passages are rather astonishing for example), weights for estimating an average AVR, and thereby a custom recommendation for that user RECO[VIE-H], can be set as follows, for example:

30% (=%P1) assigned to the number of moments of interest Numb[LAB1],

50% (=%P2) assigned to the whole cumulated duration of those moments of interest Dur[LAB1(TSi)], 10% (=%P3) assigned to the number of moments of true emotion Numb[LAB2], 10% (=%P4) assigned to the whole cumulated duration of those moments of true emotion Dur[LAB2(TSi)].

In another example, the viewer VIE-H can wish to enjoy movie extracts only corresponding to the most funny passages in the content and, in that example, weights for estimating his recommendation RECO[VIE-H] can be set as follows:

10% (=%P1) assigned to the number of moments of interest Numb[LAB1],
10% (=%P2) assigned to the whole cumulated duration of those moments of interest Dur[LAB1(TSi)],
30% (=%P3) assigned to the number of moments of true emotion Numb[LAB2],
50% (=%P4) assigned to the whole cumulated duration of those moments of true emotion Dur[LAB2(TSi)].

The present invention can be embedded in a computer program product (having for example an algorithm or a part of that algorithm, as described above with reference to FIG. 3), which comprises all the features enabling the implementation of the methods described herein, and which, when loaded in an information processing system (for example a user equipment or a network element), causes the information processing system to carry out the invention. Computer program means or computer program in the present context mean any expression, in any language, code or notation, of a set of instructions intended to cause a system having an information processing capability to perform a particular function either directly or after the conversion to another language. Such a computer program can be stored on a computer or machine readable medium allowing data, instructions, messages or message packets, and other machine readable information to be read from the medium. The computer or machine readable medium may include non-volatile memory, such as ROM, Flash memory, Disk drive memory, CD-ROM, and other permanent storage. Additionally, a computer or machine readable medium may include, for example, volatile storage such as RAM, buffers, cache memory, and network circuits. Furthermore, the computer or machine readable medium may comprise computer or machine readable information in a transitory state medium such as a network link and/or a network interface, including a wired network or a wireless network, that allow a device to read such computer or machine readable information.

The invention claimed is:

1. A method of content categorization comprising acts of:
rendering content within graphical user interfaces to a plurality of viewers ;
receiving multiple signals related to feedbacks from the plurality of viewers relatively to the rendered content; and
tallying the multiple received signals from the plurality of viewers to categorize the content, wherein:
the content is fragmented into a plurality of fragments having a predetermined duration,
each signal comprises data of a facial expression recognition of each viewer, to sense a mood expression of the viewer during the content rendering,
a memory is provided for storing at least timestamps associated to fragments for which an intensity of the sensed mood expression of a viewer is above a first threshold, and
a processing circuit is further provided for implementing tallying acts of:
For all the viewers and for each given timestamp, using the memory for counting a first number of viewers for which the intensity is above the first threshold during the fragment corresponding to the given timestamp, and
When the first number is above a second threshold, labelling the fragment corresponding to the given timestamp as a moment of interest of the content.

2. The method of claim 1, wherein the memory is further arranged for storing timestamps along with corresponding intensities for each viewer, and the method further comprises tallying acts of:
for each moment labelled as a moment of interest of the content, calculating an average of the corresponding stored intensities,
when said average is above a third threshold, the moment of interest is further labelled as an emotional moment.

3. The method of claim 2, wherein:
if at least a first emotional moment and a second emotional moment are separated by less than a predetermined number of fragments, then a whole part of the content extending from the first emotional moment to the second emotional moment, is labeled as one emotional moment.

4. The method according to claim 1, wherein a number of moments of interest is counted over the content fragments and data of said number are included in a data set of recommendation of the content.

5. The method according to claim 1, wherein a cumulated duration of moments of interest is counted over the whole content duration and data of said cumulated duration are included in a data set of recommendation of the content.

6. The method according to claim 3, wherein a number of emotional moments is counted over the content fragments and data of said number are included in a data set of recommendation of the content.

7. The method according to claim 3, wherein at least a cumulated duration of emotional moments is counted over the whole content duration and data of said cumulated duration are included in a data set of recommendation of the content.

8. The method according to claim 3, further comprising a step of calculating a content recommendation for a user according to a profile of the user, and wherein said content recommendation is calculated on a basis of a weighted average, weights of the average depending on the user profile and being assigned to data of a data set of recommendation of the content, said data set comprising at least data of:
number of moments of interest counted over the content fragments,
cumulated duration of moments of interest counted over the whole content duration,
number of emotional moments counted over the content fragments, and
cumulated duration of emotional moments counted over the whole content duration.

9. The method according to claim 1, wherein the first threshold is estimated on the basis of metadata related to the content.

10. The method of claim 1, wherein a plurality of types of facial expressions is sensed and respective first thresholds are associated to each type of facial expression.

11. A non-transitory computer-readable storage medium with an executable program stored thereon, wherein the program instructs a processor to perform the method of claim 1.

12. A content categorization system, comprising:
a processing circuit,
an input interface connected to the processing circuit so as to receive signals related to feedbacks from a plurality of viewers relatively to a rendered content, each signal comprising data of a facial expression recognition of each viewer, each signal resulting from sensing a mood expression of the viewer during the content rendering, a clock connected to the processing circuit for associating a timestamp to a fragment of the content for which an intensity of the sensed mood expression of a viewer is above a first threshold, and a memory connected to the processing circuit for storing at least the timestamp, an output interface for delivering content recommendation data, and wherein the processing circuit is arranged for performing, in cooperation with the input interface, the clock and the memory, tallying acts of:

For all the viewers and for each given timestamp, using the memory for counting a first number of viewers for which the intensity is above the first threshold during the fragment corresponding to the given timestamp, and When the first number is above a second threshold, labelling the fragment corresponding to the given timestamp as a moment of interest of the content, so as to feed the output interface with content recommendation data derived at least from moments of interest of the content.

13. A content categorization device, comprising:

an input interface for receiving timestamps associated to fragments of the content for which an intensity of a sensed mood expression of one or several viewers during a rendering said fragments is above a first threshold, a memory for storing at least the received timestamps, an output interface for delivering content recommendation data, and a processing circuit arranged for performing, in cooperation with the input interface and the memory, tallying acts of:

For all the viewers and for each given timestamp, using the memory for counting a first number of viewers for which the intensity is above the first threshold during the fragment corresponding to the given timestamp, and When the first number is above a second threshold, labelling the fragment corresponding to the given timestamp as a moment of interest of the content, so as to feed the output interface with content recommendation data derived at least from moments of interest of the content.

* * * * *